United States Patent Office 2,995,220
Patented Aug. 8, 1961

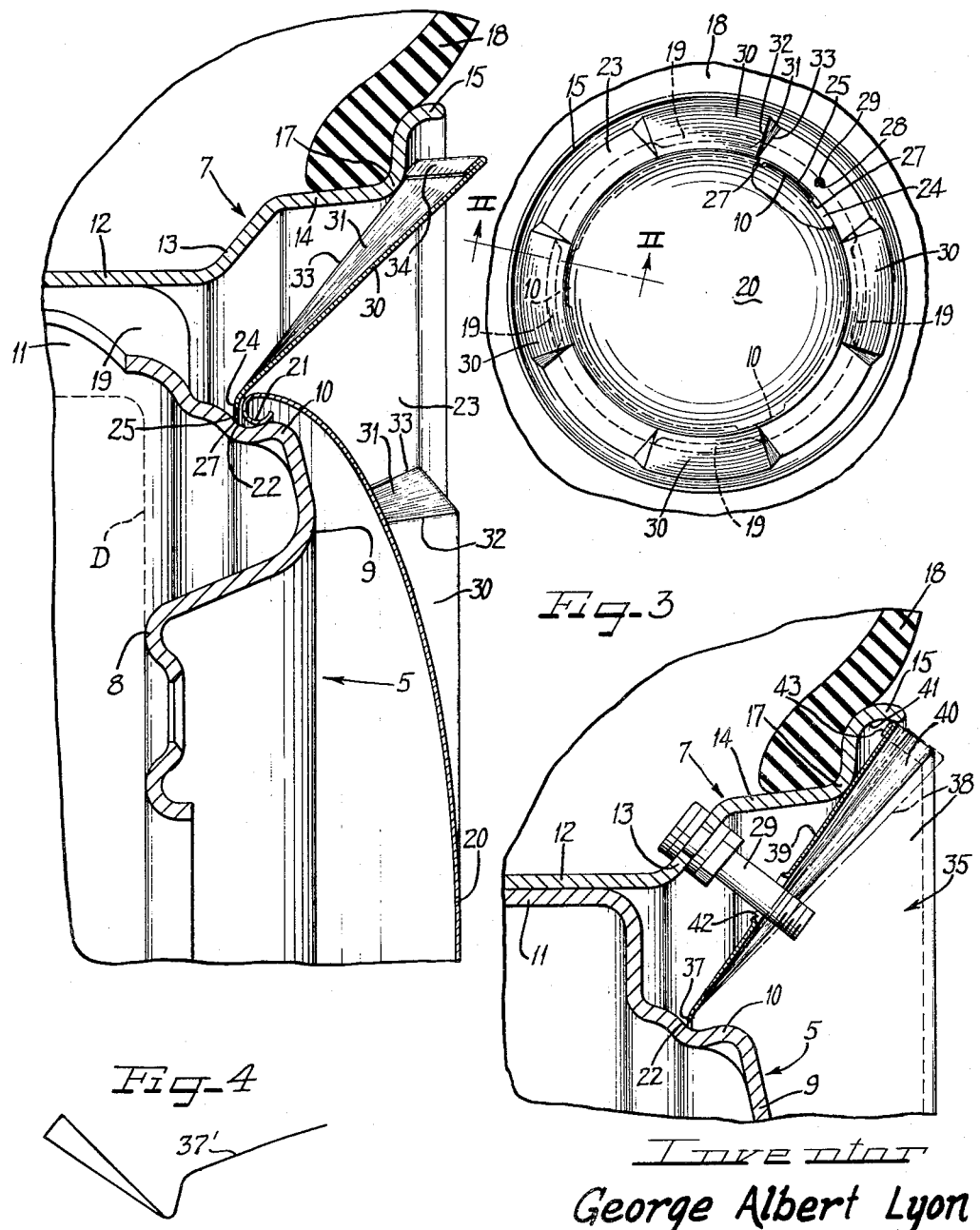

2,995,220
AIR CIRCULATION WHEEL STRUCTURE
George Albert Lyon, 13881 W. Chicago Blvd.,
Detroit, Mich.
Filed Aug. 14, 1958, Ser. No. 755,036
8 Claims. (Cl. 188—264)

The present invention relates to improvements in wheel structures and more particularly concerns a wheel structure having novel means for promoting air circulation therethrough for cooling of the wheel and especially the brake drum associated with the wheel.

The current trend in automobile wheels is toward smaller wheels and larger tires. At the same time, power, weight and speed of automobiles has been increased. This has resulted in aggravating the problem of heating of the brakes in service and more especially during high speed operation of the vehicle.

It is, accordingly, an important object of the present invention to provide an improved wheel structure including novel means for improving circulation of air through the wheel and in cooling relation to the brake drum of the vehicle with which the wheel is associated.

Another object of the invention is to provide an improved wheel trim structure for enhancing air circulation through a vehicle wheel.

A further object of the invention is to provide a vehicle wheel with improved means for promoting circulation of air through the wheel and in cooling relation to a brake drum associated therewith in the operation of the wheel.

Still another object of the invention is to provide improved combination ornamental wheel cover and air circulation promoting means for vehicle wheels.

Other objects, features and advantages of the present invention will be readily apparent from the following detailed description of certain preferred embodiments of the invention taken in conjunction with the accompanying drawing, in which:

FIGURE 1 is a partially broken away outer side elevational view of a vehicle wheel embodying features of the invention;

FIGURE 2 is an enlarged fragmentary sectional detail view taken substantially on the line II—II of FIGURE 1;

FIGURE 3 is a fragmentary radial sectional detail view through the wheel showing a modified trim member thereon; and FIGURE 4 is a profile view of a modification of the trim member of FIGURE 3.

A vehicle wheel embodying features of the invention, as shown in FIGURES 1 and 2 comprises a disk spider wheel body 5 supporting a tire rim 7. The wheel body 5 has a central inset bolt-on flange 8 by which it is adapted to be attached in the usual manner to an axle structure of a wheel including a brake drum D which is thus located within the axially inner side of the wheel. About the bolt-on flange is a generally axially outwardly projecting annular nose bulge 9 having at the radially outer side thereof a series of generally radially outwardly projecting circumferentially spaced cover retaining bumps 10 which may be three in number equidistantly circumferentially spaced.

Radially outwardly from the radially outer side of the nose bulge 9 the wheel body 5 projects a limited radial distance and is provided with an axially inwardly projecting peripheral attachment flange 11 secured in any suitable manner to a base flange 12 of the tire rim 7 which is of the multi-flange, drop center type including a side flange 13 which faces generally axially outwardly and merges with a generally axially outwardly extending intermediate flange 14 joining a terminal flange 15 on a generally radially inwardly and axially outwardly facing shoulder juncture 17. A pneumatic tire 18 of the tubeless type is adapted to be supported by the tire rim 7.

Air circulation for cooling the brake drum D is afforded through respective circumferentially spaced wheel openings 19 at juncture of the wheel body with the tire rim and provided by inset portions of the attachment flange 11 of the wheel body. As is usual, there may be four of the wheel openings 19 equidistantly spaced about the perimeter of the wheel body 9. These wheel openings as best visualized in FIGURE 1 are of substantial width circumferentially of the wheel, in a typical instance comprising each about a one-eighth segmental section of the perimeter, with intervening about equal portions of the attachment flange 11 of the wheel body making supporting contact with the tire rim base flange 12.

For protectively covering the bolt-on flange portion of the wheel body 5, a hub cap 20 is provided having a resiliently flexible peripheral wall with the edge portion thereof turned under and inwardly to provide a resilient bead 21 dimensioned to engage in press-on, pry-off relation with the retaining bumps 10. By virtue of a clover leafing action whereby the bead 21 is stretched or resiliently deflected radially outwardly where it engages the retaining bumps 10 and is drawn resiliently deflectably radially and axially inwardly intermediate the retaining bumps 10, the intermediate portions of the resilient bead 21 press toward a generally axially outwardly facing shoulder 22 about the radially outer side of the nose bulge 9 generally in line with the axially inner ends of the cover retaining shoulders of the bumps 10. This has the effect of maintaining the retaining bead 21 drawn in tensioned gripping relation against the retaining bump shoulders and slightly deflected axially outwardly away from the shoulder 22.

As means for promoting circulation of brake drum cooling air through the wheel openings 19 and in order to afford further ornamental and protective covering for the outer side of the wheel radially outwardly beyond the hub cap 20, a trim member 23 is provided in the form of a sheet metal annulus extending generally radially and axially outwardly obliquely and of an inside diameter to be engaged behind the hub cap bead 21 and an outside diameter to overlie the tire rim and more particularly the terminal flange 15. Any suitable sheet material such as strainless steel, brass, or aluminum in strip or sheet form may be utilized for the trim member 23. Where made from strip material, the trim member 23 may be rolled into shape and the free ends of the strip welded together to provide an endless annulus. Where made from sheet stock, the trim member 23 may be drawn into shape in suitable die press equipment. Any suitable finish such as lustrous polishing and plating may be provided for at least the axially outer, exposed face of the trim member 23.

For retention of the trim member 23 on the wheel, the inner margin thereof is provided with a generally radially inwardly extending angular marginal flange 24 of a diameter to seat against the wheel body shoulder 22. At the three intervals where the flange 24 opposes the retaining bumps 10, the flange is provided with respective clearance cut-outs 25 so that the trim member can readily be placed in position on the wheel or removed, with the bumps 10 clearing through the recesses 25. Respective opposite side edges defining the cut-outs or recesses 25 on the flange 24 oppose respective circumferentially facing opposite side shoulders of the retaining bumps 10 and thereby hold the trim member 23 against turning on the wheel, that is this coaction retains the trim member corotative with the wheel. This is a desirable relationship to maintain the trim member against misalignment of a valve stem aperture 28 therethrough and projecting from the side flange 13 of the tire rim. In between the retaining bumps 10, the hub cap bead 21 presses the trim member flange 24 toward and into clamped engagement with the cover shoulder 22.

At its radially and axially outer margin, the trim member 23 overlies the tire rim 7 in close proximity and may be either spaced from or engage against the tire rim and more particularly the juncture shoulder 17 between the intermediate flange 14 and the terminal flange 15. Where, as shown, there is engagement against the tire rim, it may be under resilient tension afforded by appropriate differential or axial variance as between the radially inner and outer margins of the trim member and the wheel shoulders 17 and 22 to require slight axially inward resilient deflectional pressure against the radially inner marginal cover flange 24 by the hub cap bead 21 in the fully assembled relationship of the cover components with the wheel. In other words, when the hub cap bead 21 presses the trim flange 24 axially inwardly toward and against the wheel shoulder 22, the radially outer margin of the trim member is pressed under resilient tension against the rim shoulder 17. This affords a tight, rattle proof assembly. Where there is a spaced proximate relation between the trim member and the tire rim, the trim member will be supported entirely on the wheel body.

Brake drum air cooling circulation through the wheel is promoted by means of air-passage means of the trim member 23. To this end, the body annulus of the trim member 23 is provided with circumferentially spaced series of funnel-like air-passage portions 30 which are offset generally axially outwardly relative to the intervening relatively axially inwardly offset portions of the body of the members 23. These offsets 30 are of the same number as the number of wheel openings 19 and located to overlie the respective wheel openings 19 in aligned connected air passage relation. At their radially inner ends, the air-passage offsets 30 merge into the juncture between the body of the trim member 23 and the inner marginal flange 24. From such juncture the offsets 30 diverge generally radially and axially outwardly from the normal plane of the trim member 23, or at least relative to the plane of those portions of the trim member 23 which are inset relative to the offsets 30 intermediate the offsets and in assembly are engaged against or at least closely approach the tire rim shoulder 17. In width, the air-passage offsets 30 are about as wide as the circumferential width of the respective wheel openings 19. At their radially outer ends, the air-passage offsets 30 are spaced generally axially outwardly in substantial gap relation to the underlying shoulder 17 of the tire rim and with the radially outer edge extremities projecting in air scooping relation to a plane axially outwardly relative to the tip of the lip portion of the tire rim terminal flange 15.

Combination air scoop deflecting and reinforcing, generally triangular side wing vane connecting panels 31 connect the air-passage offsets 30 to the intermediate inset portions of the trim member body, joining the respective offset and inset portions along respectively relatively sharp rib reinforcing junctures 32 and 33. As a result of reinforcement provided by the generally radially extending, though divergently related reinforcing rib junctures 32 and 33, and the generally triangular strut-like reinforcing relation of the connecting side wall portions 31 effective stiffening of the trim member 23 at substantially uniform intervals about its entire circumference is effected. This stiffening is enhanced by the alternate opposite circumferential tilt of the connecting wall portions 31. Such stiffening, however, is in the direction of increased resilient resistance to deformation of the trim member. It will be understood of course, that the angular juncture rib between the inner marginal flange 24 and the body of the trim member 23, toward which the triangular wall panels 31 and the juncture ribs 32 and 33 thereof converge additionally aids in reinforcing and improving the resilient resistance to deformation of the trim member.

Additional reinforcement and finish for the radially outer edge of the trim member 23 is afforded by a continuous underturned and preferably tightly bent over marginal flange 34. This underturned reinforcing flange provides a double thickness of material at the outer extremity of the trim member and coacts with the angular connecting wall portions 31 in effecting outer edge stiffness for the trim member highly resistive against curbing pressures or other forces tending to deform the outer edge of the trim member. As a matter of fact, due to the highly resilient nature of the reinforced trim member strong pressure against the axially outwardly projecting extremity of any of the funnel offsets 30 tends to effect a resilient reaction in adjacent portions of the trim member enabling some yielding of the affected funnel offset and then springing back without permanent deformation.

In applying the trim member 23 to the outer side of the wheel, either the hub cap 20 is first removed, or at least application of the trim member is effected before the hub cap 20 is applied or after the hub cap is removed to enable mounting of the trim member. Simultaneous orientation of the valve stem aperture 28 with the valve stem 29 and of the cut-outs 25 with respect to the retaining bumps 10 on the wheel body also properly orients the funnel offsets 30 with respect to the respective wheel openings 19. Then after the hub cap 20 has been pressed into retained position, the trim member 23 is held firmly in place on the wheel by the hub cap bead 21. In the forward movement of the vehicle in service, air is scooped by the forwardly moving funnel offsets 30 successively during the rotation of the wheel for successively moving brake drum cooling air inwardly behind the trim member and through the respective wheel openings 19 in cooling circulation relative to the brake drum D. At the rear side of the wheel as it is running, there may be an aspirating effect whereby there is a reverse circulation of air, that is from behind the trim member 23 and more particularly the respective rearmost of the funnel offsets 30 in any given instance and outwardly through the aligned wheel opening 19. As a result, effective air circulation for cooling the wheel and more particularly the brake drum D in the running of the wheel is accomplished.

In the modification of FIGURE 3, details of the wheel itself are the same as the wheel shown in FIGURES 1 and 2 and accordingly identical reference numerals indicate substantial identity of parts. However, in this form of the invention a trim member 35 is provided which is self-retaining with respect to the wheel, although it may additionally be retained in service position on the wheel by a hub cap which in FIGURE 3 is not shown, it being understood that a hub cap such as the hub cap 20 may be applied over the outer side of the wheel. On the other hand, the trim member 35 may comprise a full disk or one-piece wheel cover which will overlie the entire wheel body, this being accomplished, if desired, by having instead of a radially inner radially extending angular terminal flange 37, a continuous crown portion which will overlie the wheel body 5, as at 37' in FIGURE 4. In any event, the general shape and construction of the trim member 35 is substantially like that of the trim member 23, including alternate offset air-passage funnel portions 38 arranged to be aligned with the wheel openings, and intervening inset trim member body portions 39, the offset and inset portions being connected by obliquely angular, generally triangular connecting wall and reinforcing portions 40.

In the cover trim member 35, however, the inset portions 39, at least, are disposed at their axially outer ends on a diameter which is slightly greater than the diameter within the axially outer portion of a radially inwardly opening groove 41 provided by the lip portion of the terminal flange 15 of the tire rim.

In applying the cover 35 to the outer side of the wheel, the radially outermost extremities of the inset portions 39 of the trim member, serving as retaining flange terminals are snapped into engagement behind a generally radially and axially inwardly facing shoulder at the axially outer side of the terminal flange groove 41, this being effected by resilient lever-like radially inward yielding of the inset portions 39 and then snapping back toward normal position to engage in resiliently tensioned thrusting retaining engagement behind the groove shoulder of the rim flange. At the same time, the inset portions 39 radially and axially inwardly from the retaining tips of such portions bottom against the tire rim shoulder 17.

As an incident to applying the cover 35 to the outer side of the wheel, a valve stem aperture 42 is registered with the valve stem 29.

In order to reinforce the outer edge of the trim member 35 and more particularly the retaining terminal edges of the inset portions 39, the extremity of the trim member is turned under to provide a reinforcing and finishing double thickness edge flange structure 43. The underturned flange preferably extends continuously about the entire outer extremity of the trim member.

In order to remove the trim member 35, a pry-off tool such as a screwdriver may be inserted behind the retaining terminal of a selected one of the inset retaining flange portions 39 by projecting the pry-off tool through the air scoop mouth of one of the adjacent offset air-passage funnel portions 35 and pry-off leverage applied to spring the engaged edge of the inset portion 39 from the tire rim terminal flange lip shoulder.

It will be understood that the funnel passage offset portions 38 function in an air scooping and alternate aspirating manner similarly as described for the offset funnel-like air scoop portions 30 of the trim member 23.

It will also be appreciated that the angular connecting, reinforcing panel portions 40 serve as substantial resiliency enhancing and stiffening wing-like side flange extensions from the cover retaining flange portions 39 and with the maximum reinforcement afforded adjacent to the retaining terminal tips of the portions 39 by virtue of the greatest width of the wing flange portions 40 being contiguous the retaining tips.

It may be noted that by virtue of the substantial width of the air scoop funnel portions 30, they may, as shown, follow the general annular curvature of the member 23.

It will be understood that modifications and variations may be effected without departing from the scope of the novel concepts of the present invention.

I claim as my invention:

1. In a wheel structure including a wheel body and a tire rim supported thereby, the wheel body having a plurality of circumferentially spaced air circulation openings adjacent juncture with the tire rim, a substantially circular trim for disposition over the tire rim and the wheel openings including alternate circumferentially spaced offset portions of substantial width and intervening inset portions of substantial width connected by reinforcing angular generally triangular connecting and reinforcing wing-like portions, the inset portions being arranged for close proximity to the tire rim and the offset portions being in substantial gap relation to the tire rim and of similar number as and aligned with the respective wheel openings to scoop air in behind the offset portions and direct the same for circulation through said wheel openings in brake drum cooling relation, and means for retaining the trim member on the wheel.

2. In a wheel structure including a wheel body and a tire rim supported thereby, the wheel body having air circulation openings adjacent juncture with the tire rim, a substantially circular trim for disposition over the tire rim and the wheel openings including alternate circumferentially spaced offset and inset portions connected by reinforcing angular generally triangular connecting and reinforcing wing-like portions, the inset portions being arranged for close proximity to the tire rim and the offset portions being in substantial gap relation to the tire rim and aligned with the respective wheel openings to scoop air in behind the offset portions and direct the same for circulation through said wheel openings in brake drum cooling relation, the trim member having a radially inner margin for opposing the wheel body, and a hub cap engageable in press-on, pry-off relation to the wheel body and retainingly engageable with the inner margin of the trim member.

3. In a wheel structure including a wheel body and a tire rim with air circulation openings adjacent juncture of the body with the rim, a cover member over the outer side of the wheel and of a diameter to substantially overlie the tire rim and at least the adjacent portion of the wheel body including the wheel openings, said member having a circumferentially spaced series of alternating inset and offset portions with the offset portions equaling in number and aligned with the wheel openings, and means for attaching the member to the wheel, said inset and offset portions being interconnected by angular wing-like generally triangular reinforcing flanges and with the offset portions providing air scoop mouth ends adjacent to and spaced from the tire rim for scooping air into the offset portions and funnelling the air to the wheel openings.

4. In a wheel structure including a tire rim and a wheel body providing openings for air circulation adjacent to juncture with the tire rim, a circular cover member for disposition over the outer side of the wheel including a circular portion having inset areas for disposition in overlying proximity to the tire rim and alternating offset portions of substantial width and aligned with the wheel openings, said offset portions being connected to the inset portions by generally radially elongated triangular wing-like connecting flanges with juncture of such flanges with the inset and offset portions being on reinforcing generally radially extending rib junctures, said offset portions having the outer ends thereof in gap relation to and acting to funnel air into the gap and to the respective wheel openings.

5. In a wheel structure including a tire rim and a supporting wheel body providing openings adjacent to juncture with the tire rim for brake drum cooling air circulation therethrough and having radially inwardly from the openings radially outwardly projecting cover retaining bumps, a trim member of a diameter to overlie the tire rim and the wheel body adjacent to said bumps and with an inner margin provided with notches straddling the bumps to hold the member corotative with the wheel, said member having circumferentially spaced offset funnel-like air scoop portions alternating with intervening inset portions and with the outer ends of the air scoop portions in air passage gap relation to the tire rim, said air scoop portions having triangular funnel sides interconnecting the air scoop portions with the inset portions and affording reinforcement for the member, said funnel sides of each of the air scoop portions converging toward one another and toward said inner margin, and a hub cap for press-on, pry-off interengagement with the retaining bumps and acting to retain the member on the wheel by engagement with said inner margin of the member.

6. In a substantially circular trim member for disposition over the outer side of a vehicle wheel in air scoop relation to the wheel, a generally circular body having generally radially extending alternate inset and offset portions, said offset portions being of substantial width and generally following the circular outline of the member at the radially outer edges of the offset portions, said offset portions being provided at their sides with generally circumferentially flaring triangular connecting walls with the inset portions joined by angular reinforcing ribs to respectively the inset and offset portions, such ribs and the side walls converging to a juncture at the radially inner side of the member.

7. In a substantially circular trim member for disposition over the outer side of a vehicle wheel in air scoop relation to the wheel, a generally circular body having generally radially extending alternate inset and offset portions, said offset portions being of substantial width and generally following the circular outline of the member at the radially outer edges of the offset portions, said offset portions being provided at their sides with generally circumferentially flaring triangular connecting walls with the inset portions joined by angular reinforcing ribs to respectively the inset and offset portions, such ribs and the side walls converging to a juncture at a radially inner portion of the member.

8. In a trim member for disposition in air circulation relation over the outer side of a wheel including a wheel body and a tire rim with openings through the wheel for air circulation, a generally radially and axially outwardly oblique annular body portion having a plurality of circumferentially spaced generally radially extending offset portions of substantial width and generally following the annular curvature of the annular portion and intervening inset portions of the annular portion and angular offsetting generally triangular vane-like flange portions interconnecting said offset and inset portions.

References Cited in the file of this patent

UNITED STATES PATENTS

| | | |
|---|---|---|
| 1,386,405 | Hills | Aug. 2, 1921 |
| 2,106,702 | Campbell | Feb. 1, 1938 |
| 2,755,140 | Lyon | July 17, 1956 |
| 2,760,605 | Lyon | Aug. 28, 1956 |
| 2,760,606 | Lyon | Aug. 28, 1956 |

FOREIGN PATENTS

| | | |
|---|---|---|
| 581,308 | France | Sept. 5, 1924 |
| 689,432 | France | May 27, 1930 |
| 532,367 | Italy | Aug. 22, 1955 |